United States Patent [19]

Siegel

[11] Patent Number: 5,494,756
[45] Date of Patent: Feb. 27, 1996

[54] METHOD FOR WET CHEMICAL SURFACE MODIFICATION OF FORMED POLYSILOXANE PRODUCTS AND COATED SUBSTRATES SILICONES

[75] Inventor: Rolf Siegel, Wuerzburg, Germany

[73] Assignee: General Electric Company, N.Y.

[21] Appl. No.: 62,646

[22] Filed: May 14, 1993

[30] Foreign Application Priority Data

May 16, 1992 [DE] Germany .......................... 42 16 271.8

[51] Int. Cl.⁶ ........................................ B32B 9/04
[52] U.S. Cl. .......................... 428/447; 174/35 R; 385/900; 424/443; 427/2.11; 427/2.31; 427/58; 427/102; 428/907; 528/482; 528/489
[58] Field of Search ..................... 528/482, 487, 528/489, 491, 499; 427/2, 340, 341, 444, 306, 387, 2.11, 2.31, 58, 162; 174/35 R; 385/900; 428/447, 907

[56] References Cited

U.S. PATENT DOCUMENTS

| | | | |
|---|---|---|---|
| 3,561,995 | 2/1971 | Wu et al. | 427/444 X |
| 3,900,617 | 8/1975 | Grenoble | 427/387 |
| 4,332,922 | 6/1982 | Kossmehl et al. | 427/341 X |
| 4,701,490 | 10/1987 | Burkhardt et al. | 528/489 X |
| 4,943,460 | 7/1990 | Markle et al. | 428/36.9 |
| 5,217,492 | 6/1993 | Guire et al. | 427/2 X |

*Primary Examiner*—Michael Lusignan

[57] ABSTRACT

A procedure is described for wet chemical surface modification of formed articles and substrates coated with made of organopolysiloxanes: the articles formed were contacted with metal hydroxide solutions to tailor the binding capacity for ions, particularly metal ions, bivalent cations, organic macro anions, and organic macro cations, e.g. proteins. The procedure creates organopolysiloxane surfaces which are better wettable, have reduced surface resistance, are less sticky, are smoother and more biocompatible.

30 Claims, No Drawings

METHOD FOR WET CHEMICAL SURFACE MODIFICATION OF FORMED POLYSILOXANE PRODUCTS AND COATED SUBSTRATES SILICONES

The present invention relates to a wet-chemical method for surface-modifications of articles formed or fabricated out of organopoly-siloxanes as well as the usage of such products.

The term "surface", as it is used herein, comprises the surface of products made out of organopolysiloxanes, which are wetted and modified by means of the solutions of this to the invention. Sometimes these solutions can cause swelling, which shows that the material beneath the surface of the product is modified. In order to distinguish, the term "upper" surface will be used where swelling does not occur and "deeper" surface will be used where swelling does occur.

Organopolysiloxanes are known and are described in detail for example, in the German Patent DE 29 10 010 and by Eugene G. Rochow: Silicon and Silicones, Springer-Verlag Berlin Heidelberg 1987. Commonly used terms for this are for example silicone, silicone-elastomer or silicone rubber. Included within the term "organopolysiloxane" for the purpose of describing the present invention are fluorosilicones and copolymers of fluorosilicones, dimethylsilicones, phenyl containing silicones, vinyl containing silicones and substituted silicones, silicone resins, blends of silicone resins and elastomers, silicone gels, silicone liquid elastomers, and other siloxanes which are solids at room temperatures. Also these polymers, which contain organopolysiloxanes as an integral part of the molecule, are, for example, described in German Patent DE 37 25 728 or U. S. Pat. No. 4,62.5,007, are included within the term "organopolysiloxane".

Examples of products which are formed parts made from organopolysiloxanes are drainage tubes, tubes for roller pumps, blood catheters, shunt systems, T-drains, intraocular lenses, contact lenses, skin expanders, mammary implants, tracheostoma vents, comforters, membrane dressings, foils, insulation for (pacemaker) electrodes, (finger) joint replacements, vascular implants, urinary catheters, spark plug boots, automotive seals and gaskets, profile seals for multipane thermal windows, bellows, ground material of silicone rubber (silicone particles in the micron and millimeter range), rollers (platens) for photocopiers etc.

The surfaces of products made out of organopolysiloxanes exhibit negative characteristics under certain conditions:

they are hydrophobic and poorly water-wettable (in contrast, for example, devices such as contact lenses made out of organopolysiloxanes should have a hydrophilic surface to avoid a foreign body feeling).

they easily accumulate electrostatic charges because of their high surface resistivity in the range of $10^{15}$ Ohm. This causes the surfaces of products made out of organopolysiloxanes to collect dust easily and get dirty easily.

they are of a "sticky nature". This causes for example that tracheostoma vents to encrust easily, meaning that the surface will get coated with tracheal secretion. The secretion is hard to remove. Thus chest drains or bile duct drains can clog.

they are not biocompatible. For instance, the contact of blood with the surface of a silicone rubber tubing damages the thrombocytes and activates the clotting cascade. Silicone surfaces are also little suited as cell culture substrates for mammalian cells. For example, endothelial cells can not be cultivated on a silicone surface.

Thus the present invention wet-chemically modifies the surfaces of formed parts made out of organopolysiloxanes using of safe, inexpensive chemicals, in such a way that these surfaces exhibit new, stable properties; especially that they have a bonding capacity for ions and their bonding density per square centimeter for ions can be tailored and/or can be better wetted and/or have a reduced surface resistivity and/or are less sticky and/or are smoother and/or are more biocompatible, compared to the corresponding untreated surfaces of formed parts made out of untreated organopolysiloxanes.

This is accomplished by first contacting the entire or selected parts of the surface of formed devices made out of organopolysiloxanes with one or several metal hydroxides being in solution, preferably alkali earth metal hydroxides, more preferably alkali metal hydroxides and most preferably sodium or potassium hydroxides and then the surfaces may be washed, then contacted with an ion-containing solution or suspension, may be washed again, and, may be contacted with another ion-containing solution or suspension and washed again.

Magnesium hydroxide, calcium hydroxide, strontium hydroxide or barium hydroxide are the preferred alkali earth metal-hydroxides.

Lithium hydroxide, sodium hydroxide, potassium hydroxide, rubidium hydroxide and cesium hydroxide are the preferred alkali metal hydroxides, with sodium and potassium hydroxides being the most preferred.

These alkali earth metal hydroxides, or alkali metal-hydroxides are soluble. or suspendable in water, in short-chain aliphatic alcohols, like methanol, ethanol, n-propanol or 2-propanol as well as in mixtures of these solvents, for example, in a water-methanol-mixture (1:5 by volume) Although solutions of metal hydroxides are preferred, suspensions can be used, for example, lime or barytic water.

The term "to contact", as it is used here, covers terms such as to submerge (and pull out again), to spray, to wash, to brush, to mix (and separate again), to treat, to coat, to impregnate etc. the entire surface or selected parts of the surface of products made out of organopolysiloxanes in/with the solutions being used according to the invention.

The present invention provides a method for a wet-chemical surface modification of articles made out of organopolysiloxanes, comprising that i) the entire surface or selected surface areas of the article made out of organopolysiloxanes are contacted with one or several metal hydroxides which are in solution or suspension, preferably alkali earth metal hydroxides, more preferred alkali metal hydroxides and most preferred sodium or potassium hydroxides, and then may be washed, then ii) contacted with an ion-containing solution or suspension and may be washed again, and may be contacted again with another ion-containing solution or suspension and washed again.

Another aspect of the present invention is a method for a wet-chemical surface modification of articles made out of organopolysiloxanes, comprising that the method employs contacting the surface of the article with ion-containing solutions or suspensions consist of tap- or sea-water, salt solutions or solutions or suspensions of aminoacids, oligopeptides, peptides, lipopeptides, lipoproteins, glyco proteins, proteins, dyes, pharmaceuticals or carboxylate, phosphate, sulfate, sulfonate or ammonium groups containing polyols, e.g. saccharides, oligosaccharides or polysaccharides.

The invention also includes the use of the products made according to the process of this invention as adsorbents for charge-carrying compounds, especially as a chromatographic material, especially for ion-exchange or affinity-chromatography, as well as the use of such products as medical devices in contact with body fluids, such as secretions, mucus, urine, exudation-or transudation fluids or blood, for example, (drainage) tubing, roller pump tubing, (blood) catheter, shunt systems, T-drains, intraocular lenses, contact lenses, skin expanders, mammary implants, tracheostoma, vents, pacifiers, nipples, membrane dressings, foils, insulation for (pacemaker) electrode (finger) joint replacement, vascular implant, urinary catheter etc.

Other uses of such products include a cell culture substrate, especially for cultivation of anchorage-dependent (mammalian) cells; a substrate for "solid phase" diagnostics like RIAs or ELISAs based on surface modification with oligopeptides and/or peptides and/or proteins and/or pharmaceuticals etc.; as protein surface-modified substrates for biotechnological applications, like immobilized enzymes; as catalysts; as light-collecting systems or light conductors; as shielding against electromagnetic fields; and as a polymer material with surface-resistivity below 108 Ohm as well as a variety of industrial uses where surface modification is desirable or resistance to dirt pick up improves the utility of the product.

In many cases it is advantageous to use a sieve. The formed parts are positioned on a sieve, screen or porous vessel which is submerged into the metal hydroxide solution. After the contacting time is over, it is removed from the metal hydroxide bath.

Excess metal hydroxide solution is drained before submerging the sieve, for example, into a washing solution. This way, the parts can be contacted with several different solutions without being touched by hand.

The contacting-time of the products with the metal-hydroxides solutions or suspensions can be varied in a wide range: it can take from seconds to days. The contacting-time depends on the solvent (mixture)used, or the metal-hydroxides used, their concentration, the temperature of the solutions or suspensions and on the type of the organopolysiloxane on the formed part to be surface-modified.

Substrates may be in any shape and may be prepared by extrusion, blow molding, injection molding, compression molding, casting and the like. Organopolysiloxanes useful herein are solids at room temperature, preferably elastomers such as liquid silicone elastomers, room temperature curable silicone rubber, heat curable silicone rubber and may contain extending and/or reinforcing fillers or be unfilled.

The solvents or solvent mixtures used can be varied in wide ranges. If for example, the surface of a silicone tubing of a low Shore durometer hardness is to be modified only "superficially", water is the preferred solvent. For a deeper penetrating surface-modification, alcohols are added to the water, or alcohols are used.

The concentrations of the metal hydroxides can be varied successfully in wide ranges: concentrations for sodium hydroxide in water, for example, range from approximately 0.05 weight percent to super saturation.

The temperatures of the solutions can also be varied over a wide range: for a sodium hydroxide solution in water of 20 weight-percent, for example, temperatures can range from 1 degree Celsius to approximately 95 degrees Celsius. Usually the surfaces of the molded parts are contacted with the metal hydroxide-containing solutions at room temperature. Those parameters each can be experimentally optimized, since as a rule the bulk and physical properties, of the molded parts must not be adversely affected.

The contacting of the surfaces of parts made out of organopolysiloxanes using metal hydroxide-containing solutions or suspensions led to the unexpected result that the treated surfaces become charged. They receive a negative charge which is firmly anchored in the surface. It was also found that the charge density per square centimeter is proportional to the temperature of the metal hydroxide solution, to the concentration of the dissolved metal hydroxides and to the contacting-time. As a result, accordingly charged parts, even without washing, are suitable as adsorbents for cationically charged particles, for example, dyes, see example 3).

As a rule, the molded parts are washed after contacting with metal hydroxide in order to remove excess metal hydroxide and solvent. For this, deionized water (conductivity <0.1 µS/cm) or an aqueous, non-ion-containing solvent mixture, for example, a water-alcohol-mixture are used. The pH value of the washing-solution shall be above 3. In this way, the surface of the molded parts retains its negative charge.

The term "ion-containing solution", as it is used here, covers solutions in which dissolved compounds are dissociated in anions and cations, being able to wander in an applied electrical field to their corresponding counter pole, thus possessing electrophoretic mobility.

The most simple examples for ion-containing solutions are tap or sea water, or solutions or suspensions of inorganic salts.

"Ion-containing solutions" also include solutions or suspensions of amino acids, oligopeptides, peptides, proteins, low-molecular weight, dissolvable or suspendable, synthetic polymers, like polyamide or Polymin P®, dyes, pharmaceuticals or carboxylate, phosphate, sulfate, sulfonate or ammonium group-containing polyols, for example, saccharides, oligo-saccharides or polysaccharides, if they possess a negative or a positive charge in solution. This can easily be achieved by adjusting the pH value of the solution to below or above the pK or the isoelectric point (IEP) of these dissolved compounds.

In most cases deionized water is suitable for the preparation of an ion-containing solution. The addition of small amounts of short-chain aliphatic alcohols, for example, 2-propanol, may help to dissolve hydrophobic aminoacids, like tyrosine, or hydrophobic oligopeptides or hydrophobic dyes. The pH value of these solutions, or suspensions must be such that the dissolved, or suspended compounds are carrying a charge.

The above descriptions of the contacting parameters also apply to all aspects of the present invention. The parameters also vary in a wide range and may also, by taking into consideration the material to be modified and the goal to be reached, be experimentally determined, which is easily possible.

This novel treatment of a negatively charged part surface by contacting it with the metal hydroxide solution and then with the ion-containing solution causes the dissolved positively charged particles (cations) to become tightly bonded to the surface and thus give the surface new properties.

The selection of the cations is determined by which problem is to be solved through the surface-modification, which objective is to be achieved.

For example, the following various improved results can be achieved through a treatment with a solution, which contains monovalent cations, like $Na^+$ or $Ag^+$, the initially negatively charged surface becomes neutral, exhibits a reduced surface-resistivity and become much smoother;

through a treatment with a solution which contains cationic (basic) dyes, that only the surface of the part is dyed and becomes much smoother;

through a treatment with a glycocyamine-solution, at physiological pH, the surface of the molded part gets a —COO$^+$functionality;

through treatment with an aminoguanidin-hydrogen carbonate-solution, the surface of the molded part gets a —NH$_{3+}$functionality:

through treatment with an arginine solution, at physiological pH, the surface of the part gets a —COO– as well as a —NH$_3^+$functionality.

Usually, this treatment with an ion-containing solution is followed by a washing step with deionized water or a water-alcohol-mixture, as described above. The pH value of the washing solutions usually ranges between pH 5 and 8; should not be under pH 4 for a negatively charged surface and should not be above pH 10 for a positively charged surface.

Especially, if the treatment with an ion solution has created negatively or positively charged surface, then a further treatment with different ion-containing solution can follow. Earlier statements concerning ion-containing solutions, contacting parameters and objective apply equally when there is this further treatment. After this further treatment, there usually follows a final washing step.

The selection of the ion.-containing solution which should follow the treatment with the metal hydroxide solution depends upon the intended purpose of the surface-modified molded part:

treatment with metal hydroxide solution alone make surface-modified molded parts suitable as adsorbents for cationic charged compounds, see example 3: treatment with salt solutions bonds the cations firmly to the surface, thus the organopolysiloxane surface becomes a metal like surface - with completely different properties, see example 6: treatment with polyvalent cations, like aminoguanidine-hydrogen carbonate, guanidine hydrochloride, polymeric ethyleneimine (e.g. Polymin P®) cause positive charged surfaces making them suited as adsorbents for anionically charged compounds, see example 4.

Biocompatible polymer surfaces are obtained by contacting such anionic or cationic surface-modified molded parts with solutions of aminoacids, oligopeptides, peptides, proteins, dyes, pharmaceuticals or carboxylate, phosphate, sulfate, sulfonate or ammonium group-containing polyols, for example saccharides, oligosaccharides or saccharides. These charge-carrying compounds become firmly bonded to the surface of the molded part providing a "new" surface based on the invention.

The wet-chemically surface-modified molded organopolysiloxane parts based on the invention find their uses, for example, as adsorbents for charged compounds, especially as chromatographic materials, especially for ion exchange chromatography and affinity chromatograph, see examples 3 and4:

as medical devices such as (drainage) tubes, tubes for roller pumps, (blood) catheters, shunt systems, T-drains, intraocular lenses, contact lenses, skin expanders, mammary implants, trachestoma vents, comforters, membrane dressings (for large wounds), foils, insulation for (pacemaker) electrodes, (finger) joint replacements, vascular implants, urinary bladder catheters, devices which come into contact with body fluids like tear fluid, secretions, mucus, urine, exudates, transsudates, blood, plasma, serum etc.: see examples 5, 7 and 8;

as cell culture substrates, especially for the cultivation of anchorage-dependent (mammalian) cells, see example 8;

as with oligopeptides and/or peptides and/or proteins and/or pharmaceuticals surface-modified substrate for "solid phase" diagnostics, like radioimmunoassays (RIAs) or ELISAs, see example 12:

as with protein surface-modified substrate for biotechnological purposes, for examples for immobilizing enzymes, see example 11.

as catalysts, see example 10;

as light collecting systems or light conductors, see example 9;

as silicone release coatings as shielding against electromagnetic fields, see example 6;

as dirt resistant coatings for fabrics, paper and other substrates as well as silicone roof coatings applied over polyurethane foam as transparency enhancements for clear molded and extruded parts and coatings as an antifoulant coating for surfaces exposed to water to discourage marine life from attaching to the coated surface, e.g., boat hulls, propellers, water inlets and piping, etc.

Unless otherwise stated hereinafter, the silicone used in the rubber tubing was a standard medical grade translucent silicone rubber compound (Silastic®) obtained from Dow Corning extruded and heat cured. The silicone rubber composition may be any heat curable rubber composition with a peroxide or platinum cure systems, filled or unfilled, preferably containing fumed silica reinforcing filler. The type of silicone rubber is irrelevant to the present invention since the treatment works as well on room temperature curable silicone rubber parts, liquid injection molded silicones rubber parts, silicone liquid elastomer parts, condensation curable silicone rubber parts, addition curable silicone rubber parts and also elastomeric and resinous silicone coatings.

EXAMPLE 1

The purpose of this example is to illustrate a negatively charged surface with variations in the charge-density per square centimeter of the surface of the molded part.

3 centimeter long pieces of silicone rubber tubing are submerged into a 5.7% weight to volume solution of potassium hydroxide in methanol for a period of 0;1.5;3;4.5;6 and 7.5 minutes, thereafter they are washed with deionized water and then they are dyed with the cationic dye Pyronin G (0.2% (w/v) in deionized water) and thereafter they are washed again.

The tubing, which was not contacted with KOH, has taken no dye, whereas the other tubing pieces, corresponding to the increase in contacting time, were more intensively dyed on the surface. There is no observable difference between the 6 or 7.5 minutes of KOH contacted tubing. This is taken as an indicator that an even coating of the surface with Pyronin G molecules has resulted. The thickness of the "6 minutes" dye layer is approx. 30 ±- 5 μm. The dye layers are homogeneous. Autoclaving of the tubings in physiological saline does not detach the dye.

Contacting with a 20% NaOH solution in deionized water (w/v-weight to volume) solution exhibits similar even dyeing results, as well as to contacting the tubing with barium hydroxide solution (0.5% per weight in methanol-water (1:1 volume to volume solution).

EXAMPLE 2

The purpose of this example is to illustrate a positively charged surface with variations in the charge-density per square centimeter Molded part: Silicone (SILASTIC ®tubing, Dow Corning Start procedure as described as in example 1: contacting with KOH, washing with deionized water, then contacting over 10 hours with a aminoguanidine hydrogen carbonate solution in water (0.5% w/v) and washing with water.

The tubing pieces are then dyed with the anionic dye Coomassie® Brilliant Blue R-250 in deionized water (0.2% weight to volume solution) and are thereafter washed again.

The tubing which was not contacted with KOH has taken no dye, whereas the other tubing pieces, corresponding to the increase in contacting time, were more intensively dyed on the surface.

EXAMPLE 3

The purpose of this example is to illustrate adsorbents for cations, or cationically charged compounds Silicone rubber tubing (SILASTIC® is ground to a particle size of less than 0.2 mm. 20 gram of the ground material is put into a steel sieve and the sieve with contents is submerged into 20% per weight aqueous NaOH solution. After 30 min the sieve is removed and the excess of NaOH solution is drained off.

The wet ground material is slowly stirred with an aqueous solution of the dyes Pyronin G, Crystal Violet, and Neutral Red. After 20 minutes, the initially non-transparent solution has become considerably more transparent allowing one to see through it. The ground material is dyed.

EXAMPLE 4

The purpose of this example is to illustrate adsorbents for anions or anionically charged compounds Part: ground silicone rubber tubing, particle size <0.2mm At first, contacting with NaOH solution, as described as in example 2, then washing with deionized water and thereafter contacting for approximately 15 hours with a aminoguanidine hydrogen carbonate solution in water (0.5% w/v), pH 7. The wet ground material is put into an aqueous solution, in which the dye Coomassie ® Blue R-250 is dissolved, and slowly stirred therein. After some time, the initially non-transparent solution has become considerably more transparent allowing to see through it. The ground material is dyed.

Similar results were obtained by contacting the ground material- with ferric (111) chloride, guanidine chloride or arginine solution, instead of amino guanidine hydrogen carbonate.

EXAMPLE 5

The purpose of this example is to illustrate improvement of the sliding capacity, reduction of stickiness and improved release characteristics Molded part: Tubing for chest drains made out of silicone (Sterimed, Saarbrucken, Germany)

One half of a chest drain was contacted for 5 minutes with the KOH solution from example 1, thereafter was washed with deionized water and then contacted for 2 hours with a 5% per weight NaCl solution and washed again.

Even the inexperienced clearly feels the difference between the conventional and the, according to the invention, modified surface by testing with sliding fingertips. The effect remains after repeated sponging with a 70% 2-propanol solution (in water).

Molded part: Tracheostoma vent (BIVONA, Gary, USA). The trachestoma vents were contacted for 15 rain with a 20% NaOH solution in water (w/v), thereafter washed and thereafter contacted for 15 hours with a 0.2% $AgNO_3$ solution in water (w/v), thereafter washed again and then contacted with a 1% hydroquinone solution in water (w/v) for approximately 30 min and are washed thereafter with tap water.

Patients prefer the tracheotomy vents coated with colloidal silver since they are easier to clean and incrust more slowly.

EXAMPLE 6

The purpose of this example is to illustrate the reduction of electrostatic charges of molded parts: SILASTIC® Rx Pump Silicone Tubing (Dow Corning)

80 centimeter tubing with ends plugged were contacted for 15 min with the KOH solution as described in example 1, thereafter washed with deionized water and then contacted for 10 min with a 1% $AgNO_3$ solution in water (w/v) and then washed again and then exposed to sun light.

The black-staining (reduction of silver) of the modified tubing surface is complete after about 2 days.

The silver-coating adheres well to the surface: only mechanical means such as a knife, will destroy it. This surface treatment reduced the surface resistivity by 8 orders of magnitude from $10^{15}$ to $10^6$ Ohm. In contrast to untreated control surface, flour dust can easily blow away from this surface. Secondary Ion Mass Spectroscopy (SIMS) reveals only an added silver peak compared to the control pat. The contact angel (water/air) 1st 45 degrees (control: 100 degrees).

EXAMPLE 7

The purpose of this example is to illustrate the improvement of the water-wettability of formed part. Molded part: Contact lens material- ELASTOFILCON®, Bausch & Lomb, Rochester, USA Contacting with 5% KOH solution in water (w/v) for 7 minutes, washing with deionized water, thereafter contacting for 5 hours with 1% $CaCl_2$ solution in water (w/v), then washing with water. Contact angle (water/air): control: 90 degrees, sample: 27 degrees. The hydrophilic surface-modification is durable.

Molded part: Barium sulfate containing (blood) vascular catheter made out silicone. Contacting for 7 minutes in 5% (w/v) KOH solution in water-methanol (7: 3, v/v), then washing with deionized water, then contacting for 10 hours with 2% arginine solution in water (w/v), washing with water and further contacting for 48 hours with 0.1% o-(2-aminoethyl)-o' methyl-polyethyleneglycol 5.000 solution in water (w/v), then final washing with water.

In contrast to the untreated control, water as well as fresh drawn blood spreads obviously better on the now PEG-modified surface.

EXAMPLE 8

The purpose of this example is to illustrate the improvement of the biocompatibility of a formed part.

Part: Silicone foils cast from SILASTIC®MDX4-4210; thickness: approximately 100 μm Contacting for 0; 1; 3 and 9 minutes with 5% KOH in methanol (w/v), washing with water.

Under standard cell culture conditions the cell growth of BAE cells (endothelial cells) was rated as "excellent".

Molded part: silicone tubing, REHAU, Rehau, Germany

The inside of the tubing was contacted for 10 minutes with 20% NaOH in water (w/v), then washed and thereafter, with remains of water inside closed with plugs. After several days the interior of the tubing was contacted with a aprotinine solution and washed again. In vitro tests with regard to hemocompatibility showed a distinctly reduced platlet damage than the control.

EXAMPLE 9

The purpose of this example is to illustrate that a tubing treated by the method of this invention can be used as a light conductor Molded part: SILASTIC® tubing, length 30 centimeter, internal diameter approximately 4.2 mm Contacting the inside of the tubing for 10 rain with 5% KOH in methanol (w/v), washing with water, then contacting with 0.1 w/v (weight/volume) aminoguanidine hydrocarbonate water solution for about 15 hours, washing in water, contacting for more than 48 hours with 0.5 w/v fluorescein water solution, pH=8.5, final washing with water, taping the outer tube surface to keep the light out.

Cold light beamed into one end of the tubing will exit at the other end despite multiple knots in the tubing.

EXAMPLE 10

The purpose of this example is to illustrate that the method of the present invention can be used to prepare a catalyst wherein a coating is applied to particles to provide a high surface area catalyst.

Parts: Ground material as in example 3.

Contacting as in example 6.

Contacting the silver coated ground material with a 3% hydrogen peroxide solution (AOSEPT®, Ciba Vision, Aschaffenburg) results in lively bubble generation at the particles due to the generation of oxygen. - Untreated control material does not show bubble generation.

EXAMPLE 11

The purpose of this example is to illustrate the use of the method of the present invention to prepare a substrate for immobilizing enzymes.

Parts: Ground material as in example 3.

Contacting as described in example 9, except with the fluorescein solution being replaced by a commercial catalase solution of aspergillus niger (Catalase CLC 100 L, Novo Nordisk, Mainz) for a contacting time of more than 48 hours. Contacting this catalase coated material with 3% hydrogen peroxide solution (AOSEPT®, Ciba Vision, Aschaffenburg) results in lively bubble generation the particles due to the generation of oxygen.—Untreated control material does not show bubble generation.

EXAMPLE 12

Objective: The purpose of this example is to illustrate the use of the method of the present invention to prepare a substrate for solid phase diagnostics.

Used part: Titanium part coated with silicone (SILASTIC® MDX4-4210-Dow Corning).

The silicone coated test samples were contacted with a 5 % w/v KOH solution in methanol for 1 and 3 minutes, respectively, then washed with water, contacted with 0.1 w/v arginine water solution for more than 72 hours, washed with water, air dried. After several days, the test samples were contacted with a bovine blood serum albumin solution (BSA) (1–2 μg/ml in a phosphate buffer saline diluted potassium phosphate buffer) and then washed.

Using commercially available antibodies targeted against BSA, 28 nanograms (ng) of BSA were detected on the test sample contacted with the KOH for one minute and 48 ng of BSA were detected on the test sample contacted with the KOH solution for three minutes while on the control sample, not treated by the method of the present invention but contacted with BSA along with the two treated test samples, only 5 ng was detected.

I claim:

1. A method for modifying the surface of an organopolysiloxane article comprising:
   1) contacting the surface of the article with a solution or suspension of a metal hydroxide whereby the surface becomes charged and
   2) contacting the surface with an ion-containing solution or suspension.

2. The method of claim 1 wherein the metal hydroxide is in solution.

3. The method of claim 1 wherein the metal hydroxide is in suspension.

4. The method of claim 1 wherein the surface is contacted with an ion-containing solution.

5. The method of claims 1 wherein the surface is contacted with an ion-containing suspension.

6. The method of claim 1 wherein after 1) but before 2) the surface is washed.

7. The method of claims 1 wherein the method comprises the additional steps of 3) washing the surface and then 4) contacting the surface with a different ion-containing solution or suspension.

8. The method of claim 1 wherein the ion-containing solution or suspension is tap water, sea-water, salt solutions or solutions or suspensions of aminoacids, oligopeptides, peptides, lipopeptides, lipoproteins, glyco proteins, proteins, dyes, pharmaceuticals or carboxylate, phosphate, sulfate, sulfonate or ammonium groups containing polyols.

9. The method of claim 1 wherein the article is a molded part.

10. The method of claim 1 wherein the article is an extruded profile.

11. The method of claim 1 wherein the article is a tubing.

12. The method of claim 1 wherein the article is a particle.

13. The method of claim 1 wherein the article is a coating of organopolysiloxane on a substrate.

14. The method of claim 13 wherein the coating is a resinous coating.

15. The method of claim 13 wherein the coating is an elastomeric coating.

16. The method of claim 13 wherein the coating is a silicone release coating.

17. The method of claim 13 wherein the coating is an antifoulant coating.

18. A product of the method of claim 1.

19. The product of claim 18 which is a medical device for use in contact with body fluids.

20. The product of claim 18 which is a cell culture substrate.

21. The product of claim 18 which is a substrate for solid phase diagnostics.

22. The product of claim 18 which is a catalyst.

23. The product of claim 18 which is a light collecting system or light conductor.

24. The product of claim 18 which is a shield against an electromagnetic field.

25. The product of claim 18 which is a polymer material with a surface resistivity below $10^8$ Ohms.

26. The product of claim 18 which is dirt-resistant.

27. The product of claim 26 which is a dirt-resistant coating.

28. The product of claim 26 which is a dirt-resistant part.

29. The product of claim 18 which is a silicone release coating.

30. The product of claim 18 which is an antifoulant coating.

* * * * *